United States Patent Office 3,459,577
Patented Aug. 5, 1969

3,459,577
PROTECTIVE COATING
Jaques Weibel, Zurich, Switzerland, assignor to Dorit Chemie- und Handels AG, Zurich, Switzerland
No Drawing. Filed Nov. 27, 1962, Ser. No. 240,407
Claims priority, application Germany, Dec. 5, 1961, D 37,607
Int. Cl. C08f 45/30; C23b 7/08
U.S. Cl. 117—6       1 Claim As is known, in new buildings and when making repairs in buildings, the stairs are subject to particularly heavy service and to the risk of considerable damage, caused by the demands made on them by the builder's workmen and the transport of building material.

For protecting the stair treads and also the side walls and edges of the steps, these exposed parts have hitherto been covered with slabs, either of wood or of fiber. Such covering, however, was a matter requiring much time and therefore expensive. In addition, the covering material had each time to be suited to the particular requirements, and considerable waste could not be avoided. Besides that, such covering material afforded no protection against liquids. Such covering work had to be done by skilled workmen. In spite of the skilled execution of such work, it happened that the covering became loose because of the daily heavy demands, and this often led to accidents.

In new buildings, and when making repairs on old ones, it is also found necessary for sanitary appliances, such as baths, water-closets, washbasins, etc., to be protected from damage. Up to now this could not be done in a satisfactory manner, since no reasonably-priced material was available which could easily be suited to the differently shaped objects.

The aim of the present invention is to remove these drawbacks. The invention relates to a coating for the protection especially of stairs, platforms, window sills, corridors, floors, sanitary appliances, etc., in new buildings and when repairing buildings, and to a method of making the coating.

The coating according to the invention is characterized in that it consists of a flexible and adhesive form, yet capable of being removably applied to the object to be protected.

According to the method of making the coating according to the invention, a basic substance including an adhesive material is dissolved by the addition of solvents, whereupon fillers and further quantities of solvent are added to the mass thus obtained, and the whole is thoroughly mixed together so as to obtain a mass that can be spread.

The basic substance serving for making the coating according to the invention includes, for instance, 1 part by weight of rubber, about 5 parts by weight of solvent and 4–5 parts by weight of filler.

The method of making the mass is carried out for instance by placing 4.9 kg. of masticated rubber into a loose kneader capable of being cooled and then, service, adding in portions as a solvent a mixture of 27 l. benzine with a boiling point of 80–110° C. and a specific gravity of 0.720, and 3 l. of perchlorethylene having a boiling point, of about 120° C. and a specific gravity of 1.63, whereby as noted at first only comparatively slight additions of solvent are needed for dissolving the rubber. After the rubber has swelled up, the filler mixture, comprising (siliceous earth), 9 kg. silitine, 9 kg. powdered chalk and 6 kg. finely reduced asbestos, is brought into the kneader, whereupon the rest of the solvent mixture is added in small portions while the kneading machine is in operation. "Silitine" is the designation of a special siliceous earth consisting of about 70–75% quartz ($SiO_2$) and 25–30% kaolinite (silicate of aluminum).

There is also a conceivable form of carrying out the method, according to which the basic substance is placed together with the solvents into a vessel that can be closed, and allowed to swell up therein; after 1 or 2 days the swelled mass is brought into the loose kneader where the filler is added and well mixed with the swelled mass.

When carrying out the described method, care is taken that the basic solution is thoroughly mixed with the fillers and; this is possible for instance by treatment in a homogenizer in a satisfactory manner.

The mass prepared according to the method described hereinbefore is preferably applied to the object to be protected by means of a wide spatula or mason's trowel. To prevent the mass from adhering to the tool used to apply it, it will be well to clean the tool from time to time and to wet it.

In order to strengthen the proective coating after a first layer of the described mass has been applied to the object to be protected, it will be well to apply an intermediate layer which may consist for instance of jute canvas, a wide-meshed weave of natural or artificial fibers, a perforated strip of paper, a punctured plastics or metal foil, or flexible wire netting. Such intermediate layer is placed over the applied mass, firmly pressed thereonto, and then the outer side of the intermediate layer has another coating of the mass applied thereto. By bringing-on such an intermediate layer, the later removal of the coating is rendered much easier, inasmuch as the intermediate layer makes it possible to roll the coating up.

Under normal temperature conditions, the mass applied to the object to be protected takes about 10–15 hours to dry, it then furnishes a protective coating complying with all conditions as regards adhesion and resistance.

If the mass is applied under extreme temperature conditions (very cold or very hot) the drying time can be conveniently regulated by suitable choice of the solvents.

Alternatively, instead of natural rubber, rubber milk (latex) may for instance be used as binding agent, as also certain kinds of synthetic rubber as, neoprene in solid or liquid state, or polyvinyl alcohol or polyvinyl chloride.

Depending on the basic substance used, the solvent may be benzine with a boiling point between 60 and 140° C.; and among other solvents which may be used are white spirit, trichlorethylene, acetone, butyl alcohol and methanol.

An excellent solvent has proved to be a mixture including 18 l. white spirit and a specific gravity of 0.800, 9 l. benzine with a boiling point between 100 and 125° C., and a specific gravity of 0.750, as well as 3 l. isopropanol.

The fillers which may be used are inactive, active and highly active mineral and nonmineral substances, such as kaolin, kieselguhr, bentonite, soot, wood powder, ground cork, sawdust, finely reduced textile waste, cellulose materials, etc.

The described coating has the advantage that it is easy to apply and is extremely adaptable; even by unskilled workers who can apply it comparatively quickly and, after it has completed its purposes, remove it easily from the protected object. It prevents any slipping when walking, and affords good protection not only against knocks and blows, but also against water, dust, building waste, etc.

What I claim is:
1. A method of making a removable protective coating for the protection of surfaces of stairs, platforms, window sills, floors, corridors, sanitary appliances, etc. in buildings for a time of several weeks or months, comprising the steps of preparing 5 to 6 parts by weight of a solvent on the basis of a hydrocarbon at least a portion of the solvent is benzine having a boiling point of 80°–125° C., dissolving 1 part by weight of masticated rubber in a portion of the solvent, adding 4 to 5 parts by weight of filler material to the rubber solution and composed of a mixture of siliceous earth with powdered chalk and reduced asbestos, and mixing the entire mass while gradually adding the rest of the solvent to produce a mass that can be spread, coating the surfaces to be protected by at least one layer of said mass, and allowing the layer to dry for 10 to 15 hours, the solvent being a mixture of 27 parts by volume of benzine having a boiling point of 80 degrees–125 degrees C. and a specific gravity of about 0.72, and 3 parts by volume of perchlorethylene having a boiling point of about 120 degrees C. and a specific gravity of about 1.63.

References Cited

UNITED STATES PATENTS

| | | | |
|---|---|---|---|
| 1,908,395 | 5/1933 | Wright | 161—84 |
| 2,726,977 | 12/1955 | See et al. | 161—84 |
| 2,427,063 | 9/1947 | Mighton et al. | 260—32.8 |
| 2,561,951 | 7/1951 | Roberts | 260—32.8 |
| 2,031,674 | 2/1936 | Schneider et al. | 260—746 |
| 2,215,340 | 9/1940 | Vasen | 117—6 |
| 2,400,565 | 5/1946 | Merrill | 260—759 |
| 2,455,856 | 12/1948 | Murphy et al. | 117—6 |
| 2,611,153 | 9/1952 | Semegen | 117—6 |
| 2,212,761 | 8/1940 | Webster | 260—759 |
| 2,220,152 | 12/1940 | Hill | 260—759 |
| 3,034,915 | 5/1962 | Kornbluth | 117—6 |
| 2,643,234 | 6/1953 | Backus | 260—5 |

OTHER REFERENCES

Schildknecht Calwin E.: Polymer Processes, Interscience Publishers Inc., New York, 1956, p. 572.

ALLAN LIEBERMAN, Primary Examiner

J. H. DERRINGTON, Assistant Examiner

U.S. Cl. X.R.

260—32, 33, 41, 760